Oct. 6, 1953

L. A. EDWARDS 2,654,516

COLLAPSIBLE LUGGAGE CARRIER FOR AUTOMOBILES

Filed Feb. 8, 1952

Inventor
LEONARD A. EDWARDS.

By

Attorney

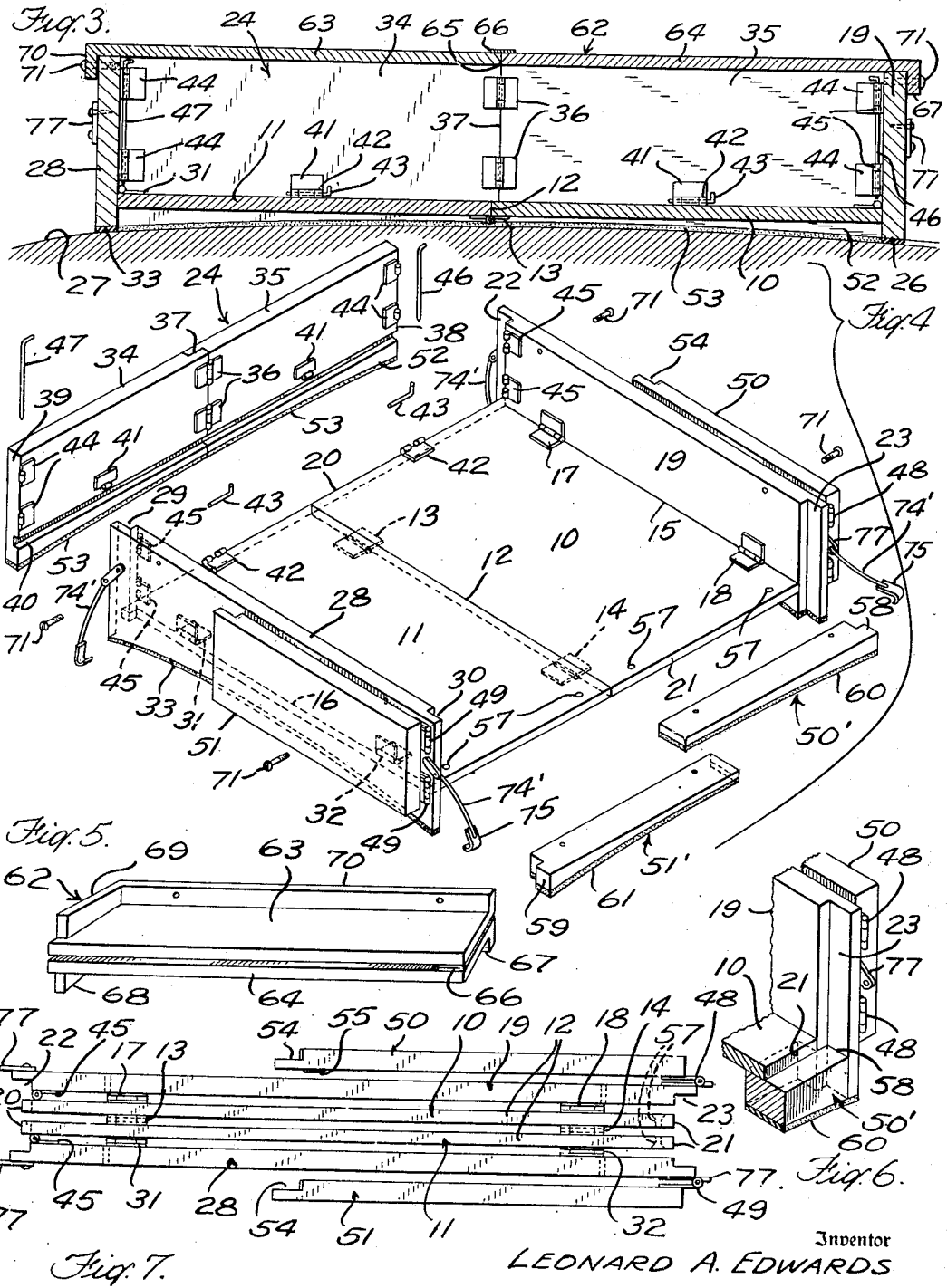

Patented Oct. 6, 1953

2,654,516

UNITED STATES PATENT OFFICE 2,654,516

COLLAPSIBLE LUGGAGE CARRIER FOR AUTOMOBILES

Leonard A. Edwards, East Hampton, N. Y.

Application February 8, 1952, Serial No. 270,639

5 Claims. (Cl. 224—42.1)

This invention relates to a closed collapsible luggage carrier for automobiles. Among the objects of the invention is to provide a carrier or container suitable for attachment to the top of an automobile and which can be collapsed or folded, or otherwise stacked within a small space for storing in the trunk or other compartment of the vehicle. The carrier is so constructed that when it is assembled and mounted in place on top of a vehicle, the same will constitute an enclosure having closely fitting joints whereby the inside of the carrier is protected from water and wind. The carrier includes a deck comprising two panels pivotally connected together along adjacent edges, and side walls separable from or foldable with respect to each other and with respect to the panels, the panels and the side walls being connected together in such a manner as to be foldable into a compact unit having a length and width approximating the length and width of a single panel, and a depth approximating the overall thickness of the panels and walls. The forward and rear walls are pivotally connected to the forward and rearward edges of the panels, respectively, and the panels are pivotally connected to each other at adjacent edges. The wall extending along aligned longitudinal edges of the panels at one side of the deck is detachably connected to each of the panels by pin connections and to the intersecting walls of the carrier at the forward and rearward edges of the deck by pin connections so that the wall may be removed when the carrier is to be stored. This latter wall may be made of two separable sections pinned together for separation or folding. The side of the carrier opposite from this latter wall is closed by two sections which serve as doors for gaining access to the interior of the carrier and are, respectively, pivoted to the forward and rear walls of the carrier.

All of the joints between the walls and between the sections are rabbeted or lapped in order to obtain secure seals. The lower edges of three of the walls extend below and in overlapping relationship to adjacent edges of the panels and have under surfaces shaped to rest on the upper surfaces of the top of an automobile. Rails underlie the edges of the panels adjacent the door sections and have under surfaces shaped to rest on the top of an automobile.

The space within the side walls and above the deck is enclosed by a cover adapted to be fastened in place and comprising two panels which are hinged together so that the cover may be folded when it is detached from the carrier. The cover has depending flanges for overlapping the upper portions of side walls. When the carrier is assembled ready for use, access may be gained to the interior by opening the pivotally mounted door sections. Means are provided for securing the carrier on the top of an automobile.

Further and other objects of the present invention will be hereinafter set forth in the accompanying specification and claims. The drawing shows a preferred embodiment of the principle of the invention and what I now consider to be the best mode in which I have contemplated applying that principle.

In the drawing, Fig. 1 is a perspective view of the carrier with the cover above and viewed from below;

Fig. 3 is a longitudinal cross-section taken on line 3—3 of Fig. 1;

Fig. 4 is an isometric view on a reduced scale showing the separable elements of the carrier body disassembled from one another;

Fig. 5 is a view in perspective of the cover shown folded;

Fig. 6 is an isometric detail view of a corner of the carrier; and

Fig. 7 is an edge view of the carrier body in folded condition.

Figure 1:
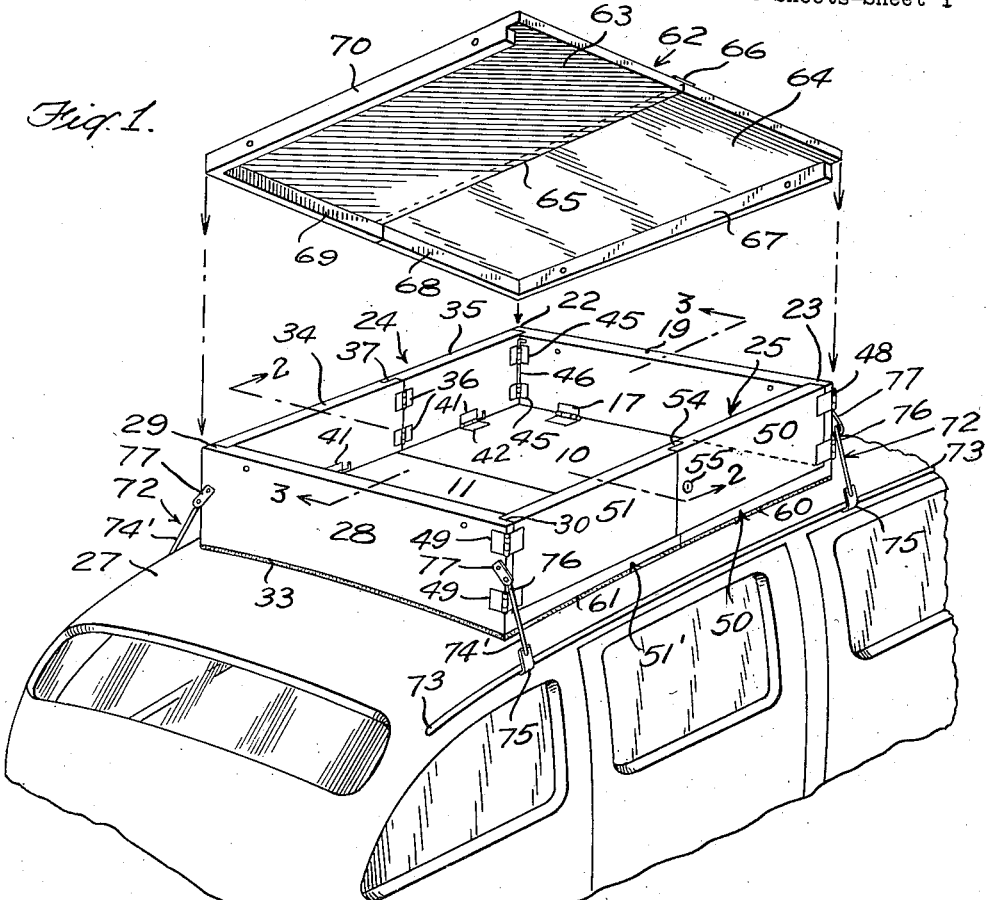

The carrier comprises a rectangular deck formed from two panels 10 and 11 which are joined together along adjacent edges 12 by means of a plurality of hinges 13, 14. The hinges are fastened to the undersides of the panels so that the adjacent edges of the panels may be raised when the panels are folded together with their under surfaces opposite one another, as illustrated in Fig. 7. For the purpose of clarity, but without limitation, the panel 10 is designated as a forward panel having a forward lateral edge 15, and the panel 11 is designated as a rearward panel having a rearward lateral edge 16. Hinges 17 and 18 are fastened to the upper surface of the panel 10 and to the inner surface of a forward side wall 19. This side wall extends beyond the longitudinal edges 20 and 21 of the panel 10. The ends 22 and 23 of the wall 19 are rabbeted to form joints with the forward ends of the side walls 24 and 25. The rabbeting is preferably such that no seam of the joints faces forward in the direction of maximum wind pressure. The lower portion of the wall 19 extends below the panel 10 and has an under surface 26 which conforms with the curve or camber of the top 27 of an automobile.

The rearward wall 28 is fashioned similarly to the forward wall 19, except that the rabbets 29, 30, are at the inner side of the wall. This latter wall 28 is pivotally mounted to the panel 11 by means of hinges 31 and 32. The lower edge 33 is shaped to conform to the curve or camber of an after portion of the top 27 of an automobile. Both the walls 19 and 28 are folded downwardly against the upper surfaces, respectively, of the panels 10 and 11, as shown in Fig. 7, when these members are collapsed for storage.

The wall 24 is preferably made of two sections 34 and 35 which are pivotally connected together by hinges 36. The abutting ends 37 of these two sections are rabbeted or otherwise lapped to provide an outside lap extending rearwardly for inhibiting the inflow of water. This wall 24 is removable from association with the panels 10 and 11 and the walls 19 and 28. When the wall 24 is mounted in erected position, the ends 38 and 39 fit the rabbets 22 and 29, respectively, of the walls 19 and 28. A horizontal groove 40 is provided for engaging the longitudinal edges 20 of the panels 10 and 11, whereby the panels are supported in a common plane.

When the wall 24 is assembled to the side of the carrier, the hinge plates 41, fixed to the wall 24, are secured to the hinge plates 42, attached to the panels 10 and 11, by means of pins 43. The hinge plates 44 at the ends of the wall 24 are likewise attached to the hinge plates 45, fixed to the walls 19 and 28, respectively, by the pins 46 and 47. These pins 43, 46 and 47 provide for facilitating the assembly and disassembly of the wall 24 from the remaining portion of the carrier. For a carrier having a length more than twice its width the sections 34 and 35 can be mounted on hinges similar to the hinges 48 and 49 and folded against the outside surfaces of the walls 19 and 28 in the same manner as the door sections 50 and 51 are foldable, Fig. 4.

The wall 24 extends below the panels 10 and 11 and the lower portion 52 has an under surface which is curved to approximate the sheer or forward and aft curve of the top of an automobile, as illustrated in Fig. 4.

Strips of soft or deformable rubber-like material 53 are attached to the under surfaces of the sections 34 and 35, respectively, and strips of similar material are likewise attached to the under surfaces of the walls 19 and 28. These strips of material serve to provide a firm and water-tight seat between the carrier and the top of an automobile.

Figure 2:
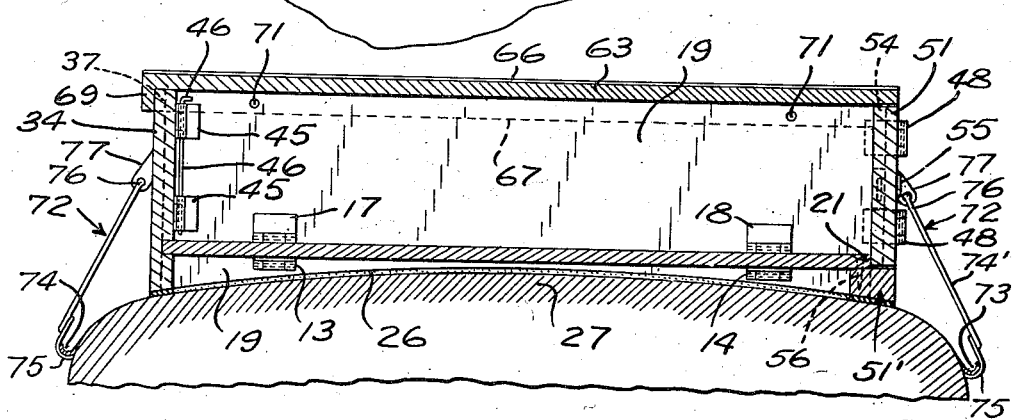
Fig. 2 is a transverse cross-section on an enlarged scale taken on line 2—2 of Fig. 1.

The side wall 25 is constituted of two door sections 50, 51, which are connected, respectively, to the forward wall 19 and the rearward wall 28 by means of the hinges 48 and 49. When the door sections are closed, Fig. 1, the hinge ends of the sections form rabbeted joints with the ends 23 and 30 of the forward and rearward walls 19 and 28, respectively, and the door sections abut and lap with the longitudinal edges 21 of the deck panels 10 and 11, as best seen in Fig. 2. The hinge knuckles of the hinges 48 and 49 are displaced from the hinge ends of the sections 50 and 51, respectively, lengthwise of the sections in order to enable these ends snugly to engage with the rabbeted ends 23 and 30 of the forward wall 19 and of the rearward wall 28. The free ends 54 of the door sections 50 and 51 are lapped with the outside lap extending rearwardly, and a lock 55 is provided for holding the door sections closed.

Rails 50' and 51' are provided for supporting the longitudinal edge 21 of the panels 10 and 11. These rails are attached to the respective panels by screws 56 (Fig. 2) for which holes 57 are provided in the panels for properly locating the screws. The forward and rearward ends 58, 59, of the rails 54 and 55, respectively, are notched to engage the grooves 23 and 30 of the respective walls 19 and 28. Strips of rubber-like material 60 and 61 are applied to the under surfaces of the rails which are curved to approximate the sheer line of the top of the automobile.

The cover 62 is preferably made of two panels 63 and 64 connected together along adjacent edges 65 by a hinge 66, which may be in the form of a flexible strip of material. The top surfaces of the panels 63 and 64 are foldable against each other, as illustrated in Fig. 5 when the cover is folded. The cover panels have rails attached thereto or flanges depending therefrom, as shown at 67, 68, 69 and 70. The flanges 67 and 70 overlap the forward and rearward walls 19 and 28, respectively, and the flanges 68 and 69 overlap the side wall 24. A number of screws 71 are provided for attaching the cover to the side walls.

When the carrier is assembled and placed in proper position on the top of an automobile, it is securely attached thereto by two pairs of members 72 connected to drain channels 73, 74 at either side of the vehicle. Each of these members includes a tension member or spring 74' and hooks 75, 76 at the ends of the tension member. The hook 75 is engaged to the drain channel and the hook 76 is engaged to a bracket 77. There is a bracket 77 attached to the outer wall surface at each end of the forward and rearward walls 19 and 28.

The deck panels, the cover panels, side walls and rails may be made of boards, plywood, aluminum, or of any other material suitable for providing a stable and relatively rigid carrier. The use of the invention as a collapsible carrier for enclosing luggage or other packages and its adaptability for storing within a small space will be apparent to those skilled in the art in view of the foregoing disclosure. The form of the carrier described is only illustrative and various features and elements in the combinations and relations described may be altered and others omitted without interfering with the more general results outlined and still be included within the scope of the appended claims.

What is claimed is:

1. A collapsible closed luggage carrier for automobiles having a solid curved top, comprising a deck composed of a pair of rigid impervious panels hinged to fold together, rigid impervious side walls hinged to the opposite side edges of said deck panels to fold inwardly against said deck panels, a rigid impervious end wall removably attached to said side walls and to said deck, said end wall extending below said deck and having a bottom edge shaped to conform to and rest on said automobile top, removable blocks extending below said deck opposite said end wall and having bottom edges shaped to conform to said automobile top whereby said container is supported by said shaped bottom edges to provide clearance below the bottom of said deck for the curved automobile top, doors hinged to said side walls to close over said deck and above said blocks, and a cover composed of a rigid, impervious panel detachably secured on said side and end walls.

2. A container, as set forth in claim 1, in which said doors meet in a lapped joint extending rearwardly to form a weather seal.

3. A container, as set forth in claim 1, in which said cover carries flanges extending over said walls to form a weather seal.

4. A container, as set forth in claim 1, in which said cover is composed of a pair of panels hinged to fold together.

5. A collapsible closed luggage carrier for automobiles having a solid curved top, comprising a deck composed of a pair of rigid impervious panels hinged to fold together, rigid, impervious side walls hinged to the opposite side edges of said deck panels to fold inwardly against said deck panels, said side walls extending below said deck to space the deck above the automobile top and having bottom edges shaped to conform to said top, a rigid, impervious end wall removably attached to said side walls and to said deck, said end wall extending below said deck and having a bottom edge shaped to conform to and rest on said automobile top, removable blocks extending below said deck opposite said end wall and having bottom edges shaped to conform to said automobile top whereby said container is supported by said shaped bottom edges to provide clearance below the bottom of said deck for the curved automobile top, doors hinged to said side walls to close over said deck and above said blocks, and a cover composed of a rigid, impervious panel detachably secured on said side and end walls.

LEONARD A. EDWARDS.

References Cited in the file of this patent

UNITED STATES PATENTS

| Number | Name | Date |
|---|---|---|
| 1,835,480 | Fendorf | Dec. 8, 1931 |
| 2,387,779 | Strauss | Oct. 30, 1945 |
| 2,440,821 | Godwin | May 4, 1948 |